March 17, 1925.  C. FORLENZA  1,530,163
WATER FILTER
Filed May 6, 1924
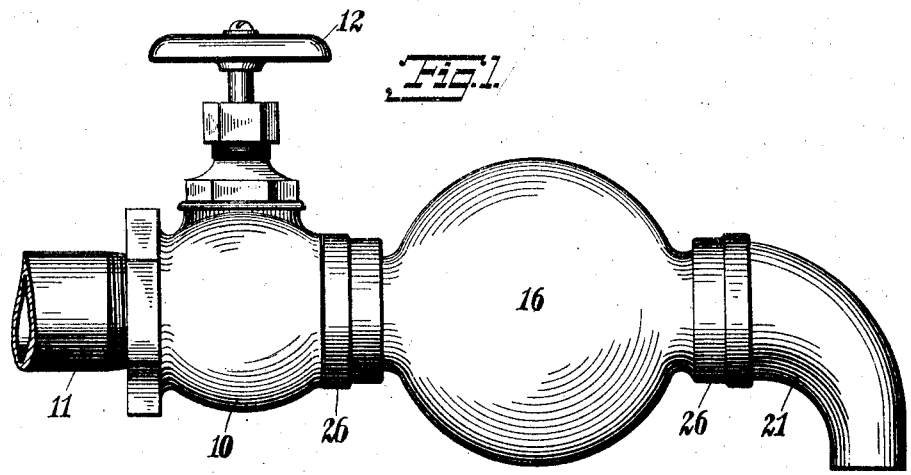
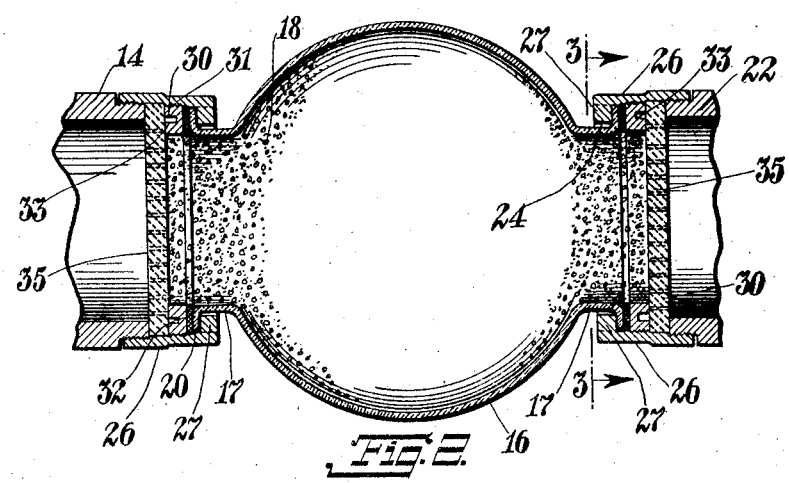
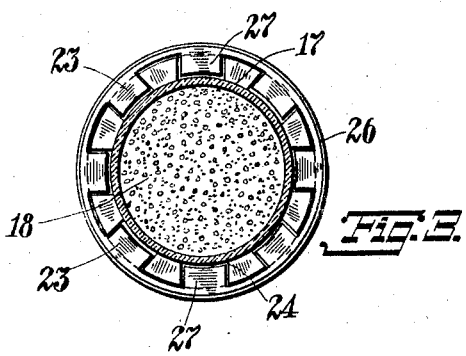
INVENTOR
Carmine Forlenza
BY
ATTORNEY Patented Mar. 17, 1925.

1,530,163

UNITED STATES PATENT OFFICE.

CARMINE FORLENZA, OF YONKERS, NEW YORK.

WATER FILTER.

Application filed May 6, 1924. Serial No. 711,310.

*To all whom it may concern:*

Be it known that I, CARMINE FORLENZA, subject of the King of Italy, residing at Yonkers, in the county of Westchester and State of New York, have invented certain new and useful Improvements in Water Filters, of which the following is a specification.

This invention relates generally to water filters, the invention being designed more particularly for embodiment in filters intended for application to the delivery faucets of water systems, or water receptacles generally.

The invention has for an object the provision of a novel and simple form of filter which will adequately filter the water and which can be readily taken apart for cleaning and renovation when desired.

For further comprehension of the invention, and of the objects and advantages thereof, reference will be had to the following description and accompanying drawing, and to the appended claims in which the various novel features of the invention are more particularly set forth.

Fig. 1 of the drawing is a side view showing my improved filter in place on a water faucet.

Fig. 2 is a central longitudinal sectional view of the filter.

Fig. 3 is a transverse sectional view taken on the line 3—3 of Fig. 2.

In the drawing the reference numeral 10 indicates the body of an ordinary faucet which is formed on one side with the usual screw nipple 11 for connection to a water supply pipe or receptacle, the usual handle for controlling the valve in the faucet being shown at 12. On the side of the body 10, opposite to that from which the nipple 11 projects, a screw-threaded neck 14 is formed around the discharge opening from the faucet body and to this neck my improved filter is adapted to be attached.

As here shown my improved filter comprises a globular body 16 which may be of transparent material and which is formed on opposite sides with the diminished projecting necks 17, and which is adapted to be filled with a comminuted filtering substance indicated at 18. These necks 17 are formed at their ends with radially extending flanges 20 which are adapted to be engaged by coupler elements which connect the filter at one end to the faucet body and at its other end with an ordinary discharge spout 21 which is formed with an exteriorly screw-threaded element similar to the neck. These flanges 20 are each formed with a series of notches 23 cut therethrough and spaced around the respective flanges, and are also formed on their inner faces with a series of pockets or recesses 24 which are interspaced between the said notches 23.

The filter is adapted to be secured to the parts 14 and 22 by means of the coupler rings 26 which are formed on one end with inturned lugs 27 of a size to pass freely through the notches 23 and engage in the pockets 24, while the opposite ends of these coupler rings are interiorly screw-threaded to engage over the parts 14 and 22. The coupler rings 26 are adapted to be secured in place on the ends of the filter by means of the bushing rings 30 which are inserted into the coupler rings and engaged with interior screw threads 31 in the latter and which act to clamp the lugs 27 against the flanges 20 rubber packing rings 32 being here shown as interposed between the rings 30 and the flanges 20. These bushing rings 30 may be formed with sockets such as 33 on their rear faces to receive the prongs of a suitable turning tool whereby they may be threaded into place or removed. Between these bushing rings 30 and the ends of the members 14 and 12 the filter disks 35 of pumice stone or like material are interposed and serve to confine the comminuted material in the body of the filter.

As will be apparent, the filter can be readily removed from the faucet or attached thereto, while it may be easily taken apart for cleaning or renovation by unscrewing the bushing rings 30 and turning the coupler rings 26 relatively to the flanges 20 until the lugs 27 on the coupler rings are in registry with the notches 23 in the said flanges.

While I have illustrated and described a preferred embodiment of my invention it will be understood that I do not limit myself to the precise construction herein shown and that various changes and modifications might be made therein without departing from the spirit and scope of the invention as defined in the appended claims.

Having thus described my invention what I claim as new and desire to protect by Letters Patent of the United States is as follows:—

1. A filter for water faucets comprising a hollow globular member having diminshed necks at each end formed with radially projected flanges, said flanges having alternating notches and pockets therein, coupler rings adapted to engage over said flanges at one end, and having radially inturned lugs adapted to engage in the said pockets said rings having their opposite ends screwthreaded to connect to the faucet body and a discharge spout respectively, and means for clamping said lugs in said pockets to rigidly secure the said coupler rings to the said globular member.

2. A filter for water faucets comprising a hollow globular member having diminshed necks at each end formed with radially projected flanges, said flanges having alternating notches and pockets therein, coupler rings adapted to engage over said flanges at one end, and having radially inturned lugs adapted to engage in the said pockets, said rings having their opposite ends screwthreaded to connect to the faucet body and a discharge spout respectively, and means for clamping said lugs in said pockets to rigidly secure the said coupler rings to the said globular member, said means comprising bushing rings screwed into the said coupler rings and bearing on the said radial flanges.

3. A filter for water faucets comprising a hollow globular member having diminshed necks at each end formed with radially projected flanges, said flanges having alternating notches and pockets therein, coupler rings adapted to engage over said flanges at one end, and having radially inturned lugs adapted to engage in the said pockets, said rings having their opposite ends screwthreaded to connect to the faucet body and a discharge spout respectively, and means for clamping said lugs in said pockets to rigidly secure the said coupler rings to the said globular member, said means comprising bushing rings screwed into the said coupler rings and bearing on the said radial flanges, and filtering disks interposed between the said bushing rings and the ends of the said faucet body and discharge spout.

In testimony whereof I have affixed my signature.

CARMINE FORLENZA.